United States Patent [19]

Gillett

[11] Patent Number: 4,934,778

[45] Date of Patent: Jun. 19, 1990

[54] ZERO INSERTION FORCE OPTICAL CONNECTOR

[75] Inventor: John B. Gillett, Woodstock, N.Y.

[73] Assignee: International Business Machines Corporation, Armonk, N.Y.

[21] Appl. No.: 265,386

[22] Filed: Oct. 31, 1988

[51] Int. Cl.⁵ .............................................. G02B 6/38
[52] U.S. Cl. ............................ 350/96.21; 350/96.20
[58] Field of Search ........................... 350/96.20, 96.21

[56] References Cited

U.S. PATENT DOCUMENTS

| | | | |
|---|---|---|---|
| 3,947,182 | 3/1976 | McCartney | 350/96 C |
| 4,220,397 | 9/1980 | Benasutti | 350/96.21 |
| 4,626,056 | 12/1986 | Andrews et al. | 339/75 MP |
| 4,629,270 | 12/1986 | Andrews et al. | 339/75 MP |
| 4,636,019 | 1/1987 | Gillett et al. | 339/17 M |

Primary Examiner—William L. Sikes
Assistant Examiner—Robert E. Wise
Attorney, Agent, or Firm—Robert L. Troike

[57] ABSTRACT

A connector mechanism optically interconnecting a first plurality of optical fibers on a first structure with a second plurality of optical fibers on a second structure. A common actuator mounted on the second structure so as to have one degree of freedom of movement only relative thereto between a first position and a second position. The common actuator locking toe two structures to each other when is an engaged juxtaposition. The second plurality of optical fibers are carried by the actuator in independent orthogonal motions relative to said first plurality of optical fibers by movement of the actuator while the structures are maintained in engaged juxtaposition.

8 Claims, 10 Drawing Sheets

ZERO INSERTION FORCE OPTICAL CONNECTOR

This invention relates to connector mechanisms for releasably connecting optical connectors and more particularly to a plurality of optical connectors and accommodating both the damage-free engagement/disengagement of two separate portions of the connector mechanisms as well as establishing the positive and accurate internal coupling required. The term "Zero Insertion Force" (ZIF) connectors frequently applies to such mechanisms.

BACKGROUND OF THE INVENTION

It is normal for data processing equipment to be made up of a plurality of cards which have electrical components and which have inter-component and inter-card electrical connections provided by conducting lines formed on the card surfaces. Such cards are assembled into a housing and/or into a board, also incorporating conducting lines, the function of which is to transmit electrical signals from component to component, card to card, and from card to board and so on. Further, repairs are affected by card replacement. The function of these connector mechanisms to which the present invention relates is to interconnect the signal carrying optical lines on any pair of abutting surfaces whether these be cards, boards, cables or housing. The present invention is an extension of applicant's earlier filed and patented connector mechanisms in U.S. Pat. No. 4,636,019 entitled "Connector Mechanisms" issued Jan. 13, 1987 incorporated herein by reference. The present invention relates to the extension of such a connector mechanism for interconnecting a plurality of optical fibers with another plurality of optical fibers. A copy of the previously mentioned patent is incorporated herewith as part of the present invention. U.S. Pat. No. 4,626,046 of Andrews et al. and entitled "Card Edge Connector" and U.S. Pat. No. 4,629,270 of Andrews et al. entitled "Zero Insertion Force Card Edge Connector with Flexible Film Circuitry", propose similar type card connectors for use with multiple conductor lines and making zero insertion force connection with flexible film circuitry. These patents are incorporated herein by reference.

SUMMARY OF THE INVENTION

According to one embodiment of the present invention there is provided a connector mechanism optically interconnecting a first plurality of optical fiber lines on one structure with a second plurality of optical fiber lines on a second structure. The connector mechanism includes the one structure including fixed contact means including a first plurality of optical fibers coupled to the first lines. The second structure including second contact means including a second plurality of optical fibers coupled to said second lines. The second plurality of optical fibers are moved in an orthogonal direction to mate with matching first fibers.

DETAILED DESCRIPTION OF EMBODIMENTS OF THE PRESENT INVENTION

Figure 1:
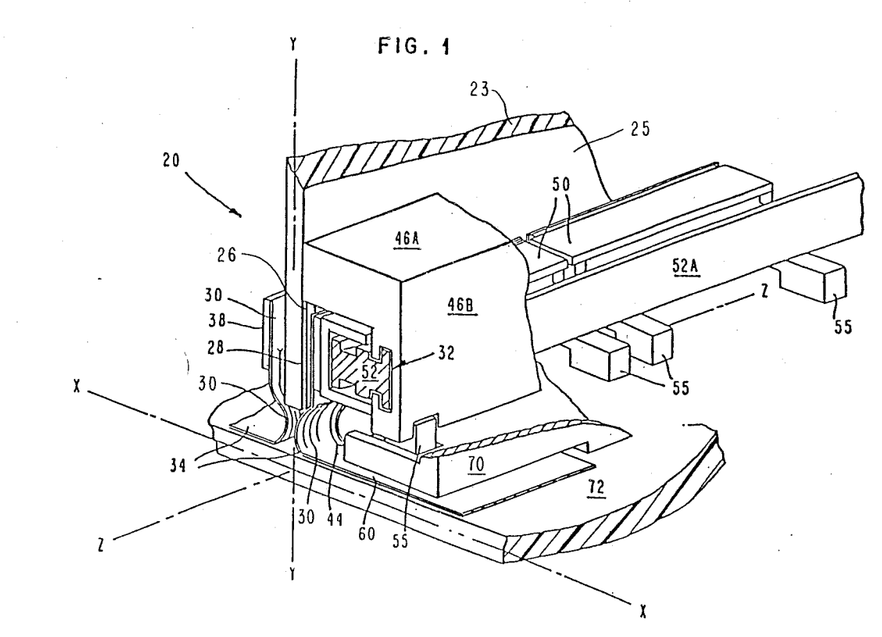
FIG. 1 is a partially cut away diagrammatic perspective view of a mated edge connector circuit board and another board interconnected by a plurality of connector mechanisms of the following form according to the present invention.
Figure 2:
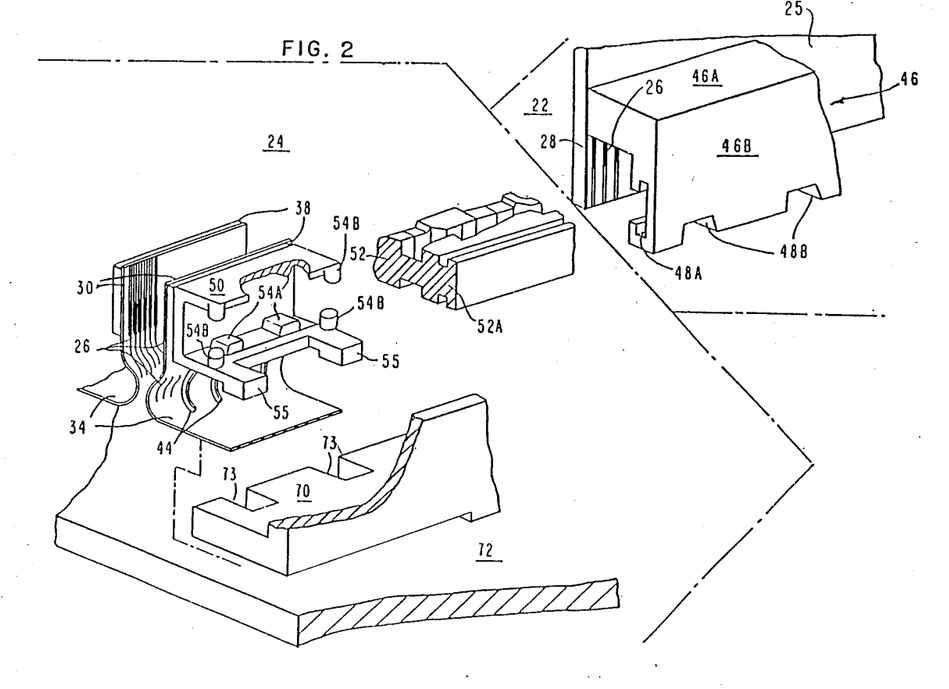
FIG. 2 is an exploded view of the arrangement of FIG. 1 cut away.

FIGS. 1 and 2 show one complete connector mechanism 20 and a plurality of partial connector mechanisms according to the present invention. Some component parts are detailed on the complete connector mechanism, which is located in the positive octant delineated by the co-ordinate axes shown in FIG. 1 and some on the partial mechanisms for clarity since they are located on surfaces of the complete mechanism that are obscured. The single connector mechanism optically connects two structures 22, 24 carrying optical fiber lines 26 embedded in plastic ribbon 34 on structure 24. The ribbon 34 is free to move towards and away from the fixed fiber lines on card or board both laterally and vertically as independent motions, under the control of a common actuator 52, each floating ribbon being an integral part, carried by the actuator.

Figure 4:
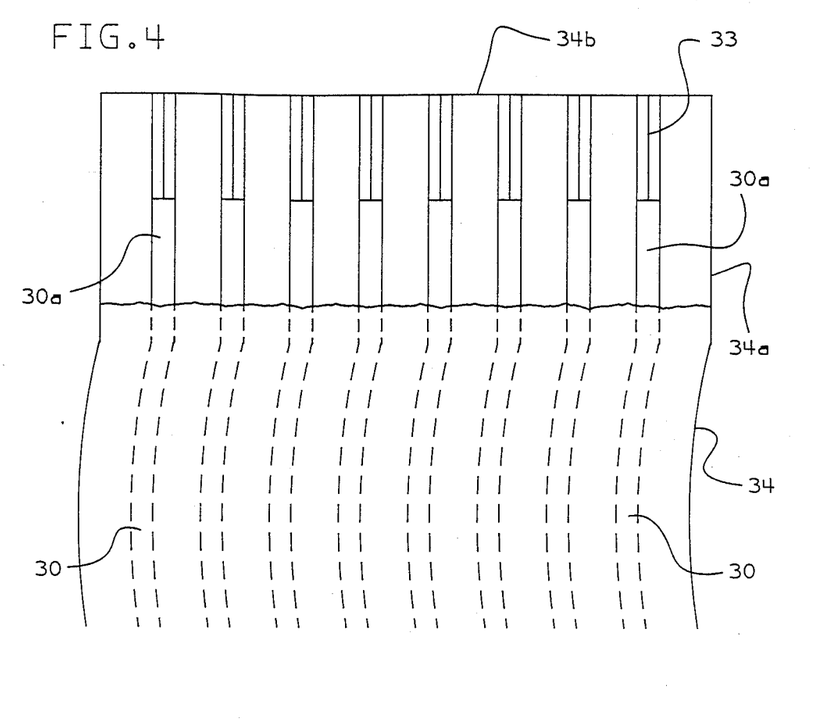
FIG. 4 is a partial view of the ribbon 34 in FIGS. 1 and 2.

The ribbon 34 is a ribbon of flexible plastic material with parallel optical fibers 30 embedded therein as shown in FIG. 4. The plastic covering is stripped near the ends as shown leaving bare optical fibers 30a extending parallel part way up a substrate pad 34a. The pad 34a is rigid and is fixed to or backs up to unstripped part of the ribbon 34. The pad 34a has V-grooves 33 that extend to the free end 34b that are colinear with the fibers 30a. The V-grooves may consist of preferentially etched grooves in a silicon substrate. In the alternative the plastic covering may serve as the pad with the V-grooves in the plastic covering and one face of the ribbon stripped away.

Figure 5:
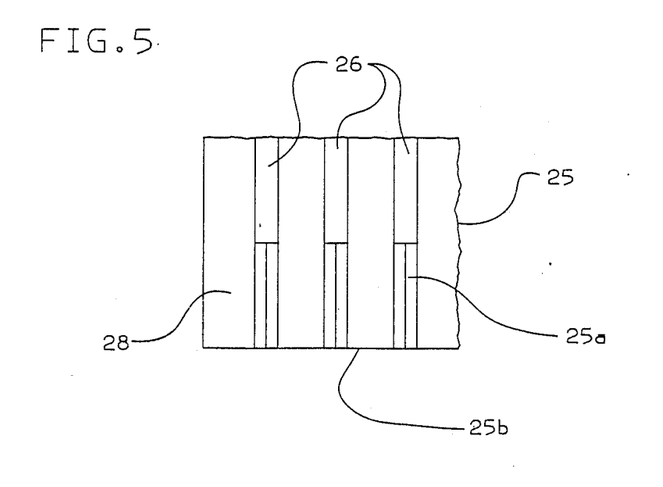
FIG. 5 is a partial view of the card of FIGS. 1 and 2.

The optical fibers 26 on the fixed structure 24 extend along V-grooves 25a formed on a substrate 25 on the board or card 23. These grooves 25a and 33 can be closely controlled by photolithography etching techniques to form very precisely defined and straight grooves in a silicon substrate. Also these grooves can be of a defined depth. The optical fibers extend part way only. The depth of the grooves and the shape of the grooves is defined such that the optical fibers of the same diameters as those on the card when pressed against the grooves are aligned with the fixed fibers on the card. Both optical fibers on the ribbon and the card are cut at right angles and polished to be mated end to end by the movement of the actuator.

As shown in FIG. 5 the optical fiber lines 26 extend only part way down the substrate 25 with the grooves continuing onto the bottom edge 25b of the substrate 25. The grooves 25a are co-linear with the lines 26 and are precisely formed such as by the photolithography etching techniques to align the half bare optical fibers 30a on the flexible ribbon with these grooves 25a at the lower end. The flexible ribbon 34 likewise has in the substrate 34a the vertical grooves 33 therein to receive the bare ends of the fiber lines 26. The grooves in the substrates 34a and 25 are such that when the fibers are packed therein and when the fibers are placed together end to end the fibers are tightly packed by movement of the actuator and the fibers are encapsulated between the substrates 34a and 25.

Figure 3:
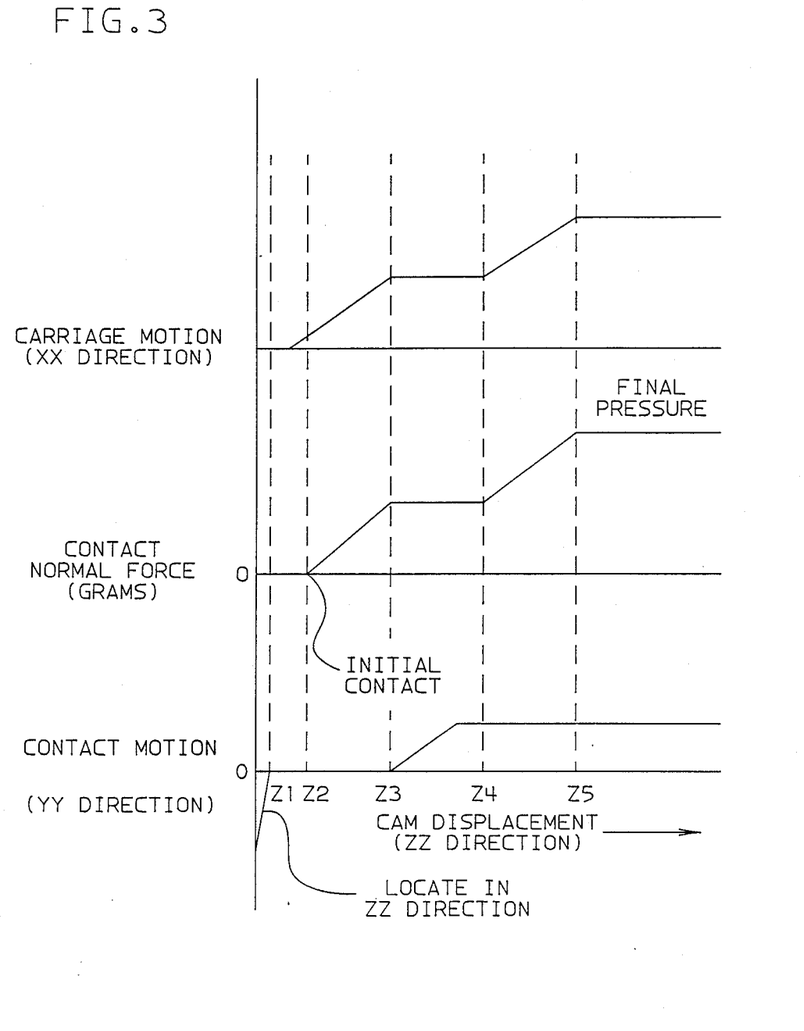
FIG. 3 is a diagrammatic graphical representation of the intercontact movements and pressures involved in the operation of the arrangement of FIGS. 1 and 2.

The common actuator is a compound camming mechanism, able to produce time separated motion in different directions (as illustrated in FIG. 3) in a single actuation, the floating substrate 34a being carried by resilient interposer 38, fixed to a carriage 50 which carries cam follower 54a and 54b engaging a linear cam 52.

When the connector mechanism 20 is assembled into the configuration shown in FIG. 1 by bringing together the two structures 22, 24 by relative movement in the ZZ direction a single pass of linear cam 52 produces the following main sequence of time separated relative movements:

Motion of the floating fibers 30a on ribbon 34 is toward the fixed grooves in XX direction until the fibers 30a just touch the surface 28 in the grooves 25a and fibers 26 in groove 33 such that the distortion of the resilient interposer 38 applies a slight pressure between the fibers 30a and 26 and the grooves, motion in the YY direction slides the fibers along the grooves 25a and 33 in the YY direction to abut the end of the fixed fibers 26 on the card to the end of the fibers 30a on the pad 34a. Finally, notion in the XX direction applies a firm pressure to maintain the optical faces in intimate contact.

The fixed contact structure 22 of the two structures shown in FIGS. 1 and 2 carries a rigidly attached shroud 46. The shroud locates the cam in the XX and YY directions with respect to the fixed contacts on initial assembly of the connector mechanisms and carries locating markings 38a, 48b which are registered with the fixed contacts. When the actuator 32 is initially actuated, by means of a handle (not shown) and carriage 50 is moved in the YY direction into engagement with the locating markings 48b of the shroud 46, locating the carriage in the ZZ direction.

The initial and terminal phases of the actuator 32 operation are relatively idle, and resetting of the actuator 32 returns the floating fibers 30 to their starting positions, retracing the listed motions in reverse order.

Figure 6:
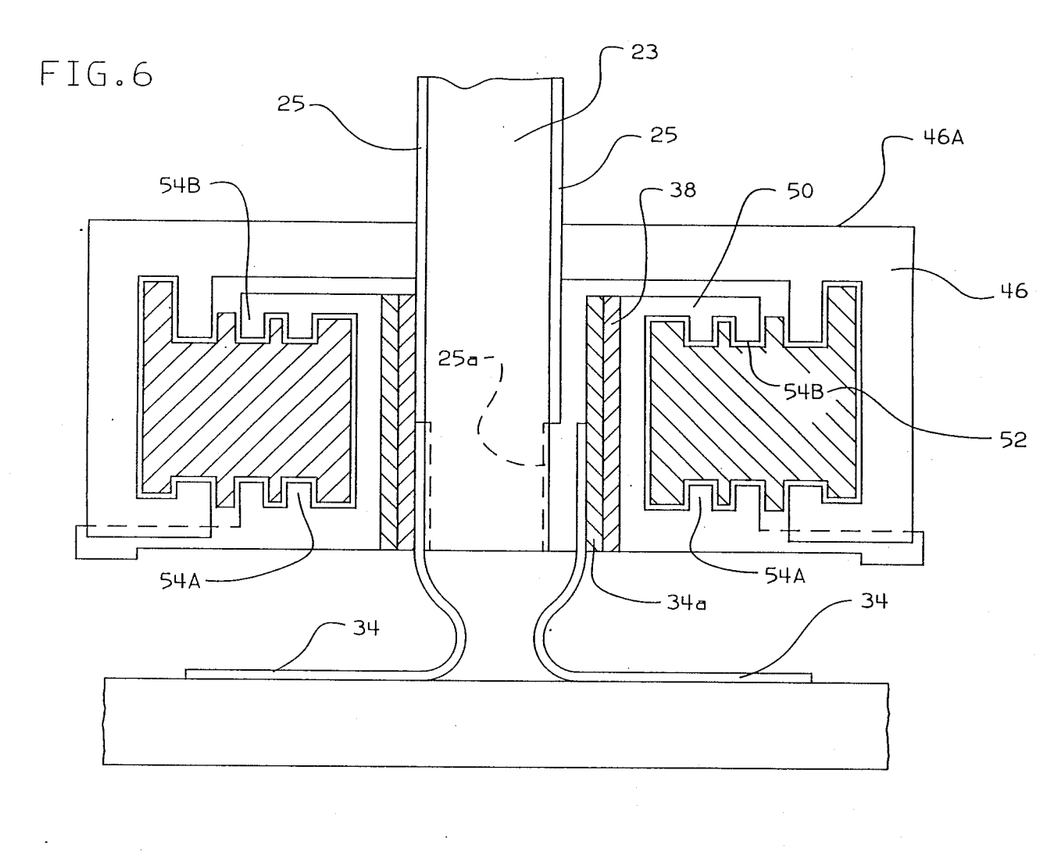
FIG. 6 is a cross-sectional sketch of the card edge connector of FIGS. 1 and 2 with one side open and the other side closed.

As already indicated, there is a connector mechanism 20 on each side of card 22, and two connector mechanisms are loosely coupled, as by member 64 (see FIG. 6).

Shroud 46 overhangs the back portion of the card with the fibers 26 and is formed to substantially equally perpendicular extents 46a and 46b. Extent 46a is perpendicular to the face of the card which it extends and parallel to card edge. Extent 46b extends parallel to the card face beyond the card edge and has a T-cross section groove 48a set into its inner surface facing the card.

Extend 46b has notches 46b let to the exposed edge. Selected surfaces of the groove and notches are accurately registered with the contact array connectors locating markings.

Linear cam 52 has an integral longitudinal rail 52a which fits into the groove 48a in the shroud and align the path direction of linear cam relative to the fixed contact array in a ZZ direction. The cam 52 has multiple pair of camming surfaces providing throws in both the XX and YY directions but these are arranged, relative to the cam follower 54a, 54b so that the currently effective throw is either entirely in the XX direction or entirely in the YY direction. The effect of these throws for a single pass linear cam is illustrated in FIG. 3.

In addition to fitting in the groove 48a in the shroud, the linear cam 52 also fits into the carriage 50 which is a generally rectangular channel, open at the ends for access in the ZZ direction and having walls extending in the XX direction. Eight cam followers are located in the inner surfaces of the carriage channel. The four followers 54a cooperate with the cam to move the carriage in the YY direction, while the four followers 54b cooperate with the cam to move the carriage in the XX direction. It is pointed out that the recited relative orientation of the component parts holds for the connector mechanisms when assembled. Clearly, since each mechanism can be dis-assembled and handled in isolation there is no absolute significance in the recited orientations. The object of the exercise is to locate the cam in the shroud and, by moving the cam in the carriage in the ZZ direction, move the carriage in both the XX direction and the YY direction while keeping these motions quite separate.

The base of the carriage channel thus aligns with the extent 46b of the shroud and resilient interposer 38 is fixed to the exposed surface of the base. The end of the flexible ribbon that carries the substrate 34a of fibers 30a, hidden from the full mechanism in the positive octant but shown for the opposed partially illustrated mechanism, is fixed to the exposed surface of the interposer with the fibers exposed and aligned with the carriage as the fibers 26 on the substrate 25 is aligned with the shroud. Intention is to center, but and align the end of the fibers on the substrate 34a on the end of the ribbon with the fibers 26 on the card and with the fibers 26 in V-grooves 33 and fibers 30a in V-grooves 25a.

The ribbon 34 passes under the carriage and is locked under the guide 70 fixed to a mother board 72, and the lines in the film may be coupled to mother board lines (not shown). Thus a single basic floating contact structure in the arrangement comprises a cam 52, the carriage 50, interposer 38, the ribbon 34, the guide rail 70 and the mother board 72 (along with a plurality of connector mechanisms as are indicated in FIGS. 1 and 2 and certain component elements are shared). The ribbon 34 may simply hang as a cable in the YY direction rather than turn 90 degrees and be fixed under guide 70.

The cam and carriage combination is connected to the mother board in FIG. 1 by the housing 70. The inherent flexibility of the ribbon 34 is enhanced by the longitudinal apertures 44 therein, but the combination can move relatively freely away from and across the mother board due to the fiber's flexibility and also due to a certain amount of ribbon length which is surplus to minimal requirements. This freedom of movement of the combination is necessary to permit interlocking of the actuator, shroud and guide rail to establish registration in a manner to be described and to permit the cam driven motion sequence of the floating contacts. The connector mechanisms of this invention are designed to be optical connectors not physical locking mechanisms. They permit the card structures to be assembled and held mechanically together, without the need for registration to a certain degree of precision, since the fine adjustment is internal, using the slack in the ribbon.

Interlocking of the component elements is partly a function of the engagement of the cam rail 52a in the groove 48a and partly a function of the engagement of a pair of lugs 55 extending outwardly and downwardly from the lower wall of the carriage, in the notches 48b in the shroud, as well as in a corresponding pair of cut-aways 73 in the guide rail.

The lugs essentially remain engaged in the cut-aways but, being of smaller dimensions, can move within the cut-aways in all three indicated directions, and, in particular, can move downwardly in the YY direction by at least the depth of the notches 48b without impacting the ribbon 34. If one considers the rail of the cam to be fixed in the YY direction relative to the mother board, which is effectively correct in all operative conditions, and the cam to be fully retracted, the cam maintains the carriage depressed sufficiently in the YY direction for the bottom of the shroud, when sliding forwardly in the ZZ direction with the cam rail engaged in the shroud groove, to clear the tops of the lugs. In this way, the notches 48b can be brought into position over the lugs. Also, during such initial engagement, other surfaces of the cam maintain the carriage, and hence the floating contacts, clear of the fixed contacts on the cart. From the point of view of establishing electrical contact connection, the camming mechanism is idle and the conceptual conditions indicated at the origins in the graphs of FIG. 3 obtain. During initial engagement, there is no relative movement of the cam with respect to the carriage. At the start with the action part of the cam out of the carriage the ribbon 34 is gapped from the card 25 as shown at the right of FIG. 6.

To establish optical connection, the cam is pulled steadily in the ZZ direction for a fixed distance, moving the carriage alternately in the YY direction and in the XX direction relative to the shroud and hence correspondingly moving or attempting to move the floating fibers relative to the fixed fibers. This activity is illustrated to the right of the origins in FIG. 3. As the cam moves in the $Z_2$ direction from its retracted position corresponding to the origin in FIG. 3 to a position indicated by $Z_1$, the carriage is raised in the YY direction relative to the shroud, moving the lugs upwardly in the YY direction into the notches 48b. The notches have tapered sides and serve to register the carriage with the shroud in the ZZ direction, consequently, similarly registering the contacts in the ZZ direction.

The next part of the action of the cam s it moves from the $Z_1$ to $Z_3$ is to move the carriage away from a shroud toward the XX direction and at that same point of the cam movement indicated as $X_2$, the resilient interposer will begin to compress. At this point the actual pressure of the fibers in the grooves begin to build as indicated in the middle of FIG. 3. The contact pressure builds due to the compression of the interposer until, at the $Z_3$, the cam ceases to drive the carriage in the XX direction and starts to drive the carriage upwardly in the YY direction. This action corresponding to travel of the cam from the $Z_3$ to $Z_4$ producing vertical movement of the fibers 30a along the grooves 25a to but with the fibers 26 end to end. Thereafter, the cam traveling from $Z_4$ to $Z_5$ ceases to drive the carriage in the YY direction and continues driving the carriage away from shroud in the XX direction, increasing the compression of the interposer and the fibers into the grooves as shown at the left in FIG. 6, whereby the end fibers are encapsulated between the pad and the card. Thereafter, the cam becomes idle maintaining the status quo until movement of the cam ceases, contact having been established at $Z_5$. It is pointed out that with the described arrangement, the card fibers are well protected. During an engagement with the cam "retracted" it is not possible to both engage the cam rail with the shroud groove and have even accidental contact collision. During the vertical movement the pressure is controlled and constant to produce a sliding action with minimum wear.

Figure 7:
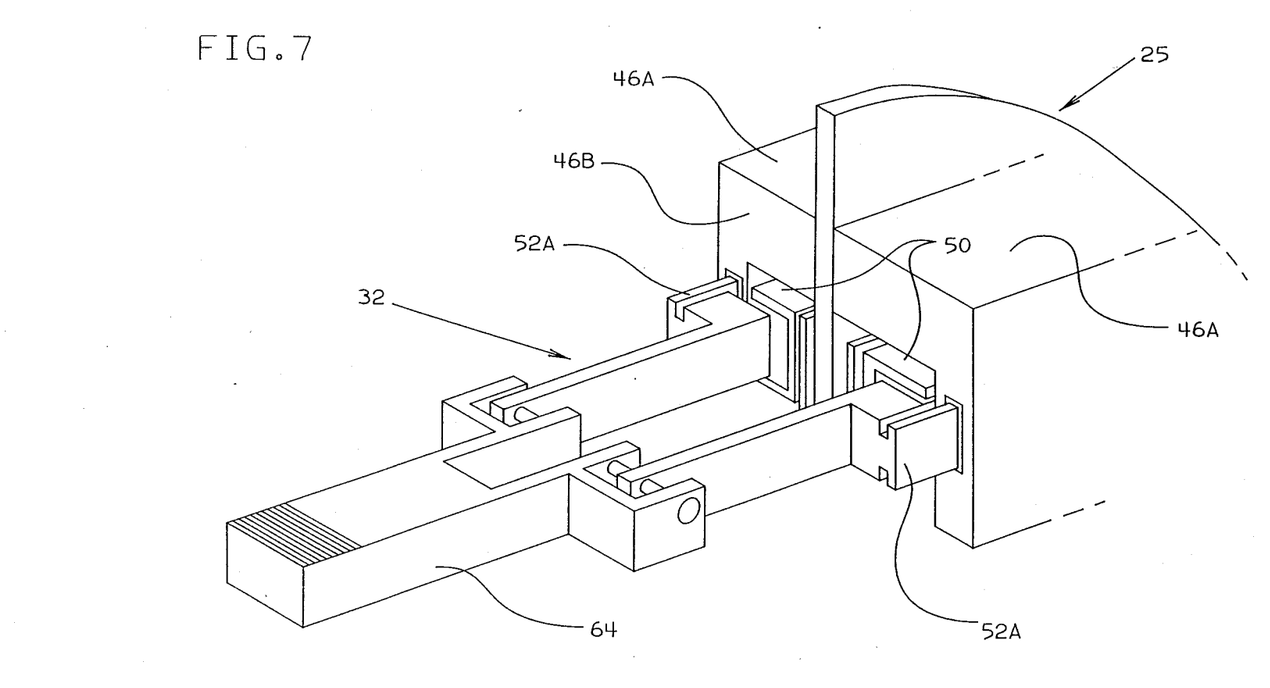
FIG. 7 is a diagrammatic perspective detailed in an alternative embodiment of the invention.

As already indicated, the basic connector mechanism connects to one area of one side of the card. As hinted at in FIGS. 1 and 2, one would reasonably expect to require connector mechanisms on both sides of a card and, for a card of significant edge length, plural ribbons, interposers (which may be springs) and carriages, per side. In this latter case, the cam and shroud, on each side of the card, can be common to all the connector mechanisms of the respective side and it is recommended that, with connector mechanisms on both sides of the card, the cams are loosely interconnected as illustrated in FIG. 7 by a coupling yoke 64.

As the cam is pushed toward its retracted position, the illustrated connector mechanism will repeat the described sequence of operations, but in the reverse order, leaving the card and shroud free to be disengaged by being slid backwardly in the ZZ direction. It is possible, however, by use of a differently constructed cam to alter the sequence of relative motions on retraction the cam so that the first action is complete separation of the contacts in the XX direction, followed by direct passage of the carriage to the point at which the carriage is depressed sufficiently to disengage the lugs from the notches 48b.

Figures 8, 9:
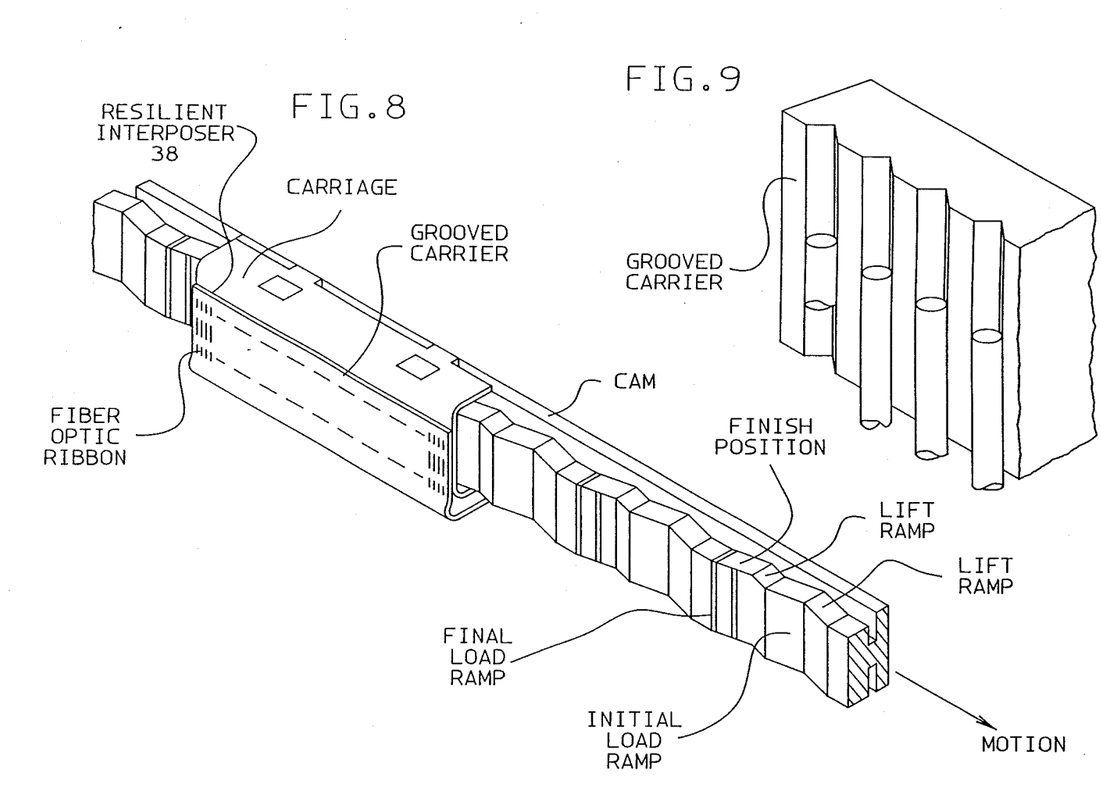
FIGS. 8 and 9 illustrate an alternative embodiment of the invention illustrating the cam and cam follower respectively.
Figure 10:
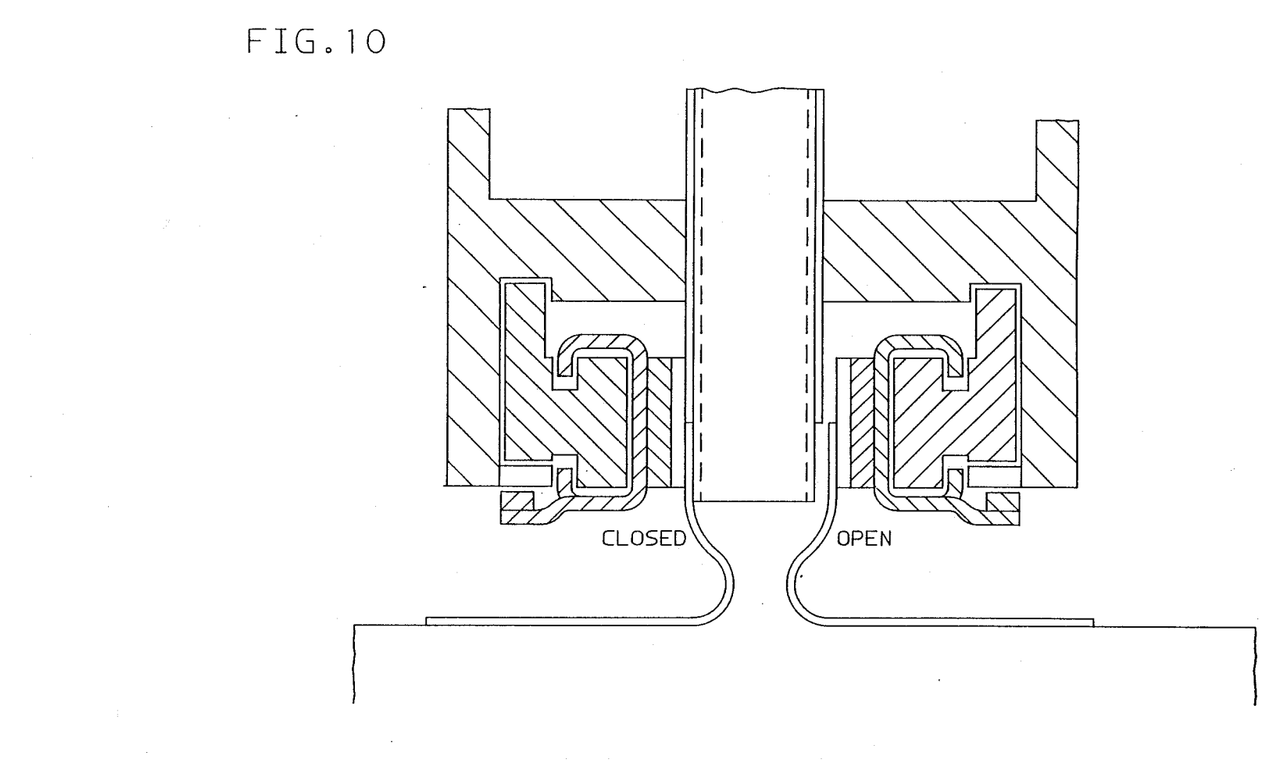
FIG. 10 is a cross-sectional sketch of the card edge connector using the cam and cam follower of FIGS. 8 and 9.

The card edge connector can be of other similar type structures such as shown in U.S. Pat. No. 4,626,056 or U.S. Pat. No. 4,629,270. If, like U.S. Pat. No. 4,629,270, the cam and groove carriers may be like that of FIGS. 8 and 9 and the operation be like that shown in FIG. 10.

Figure 11:
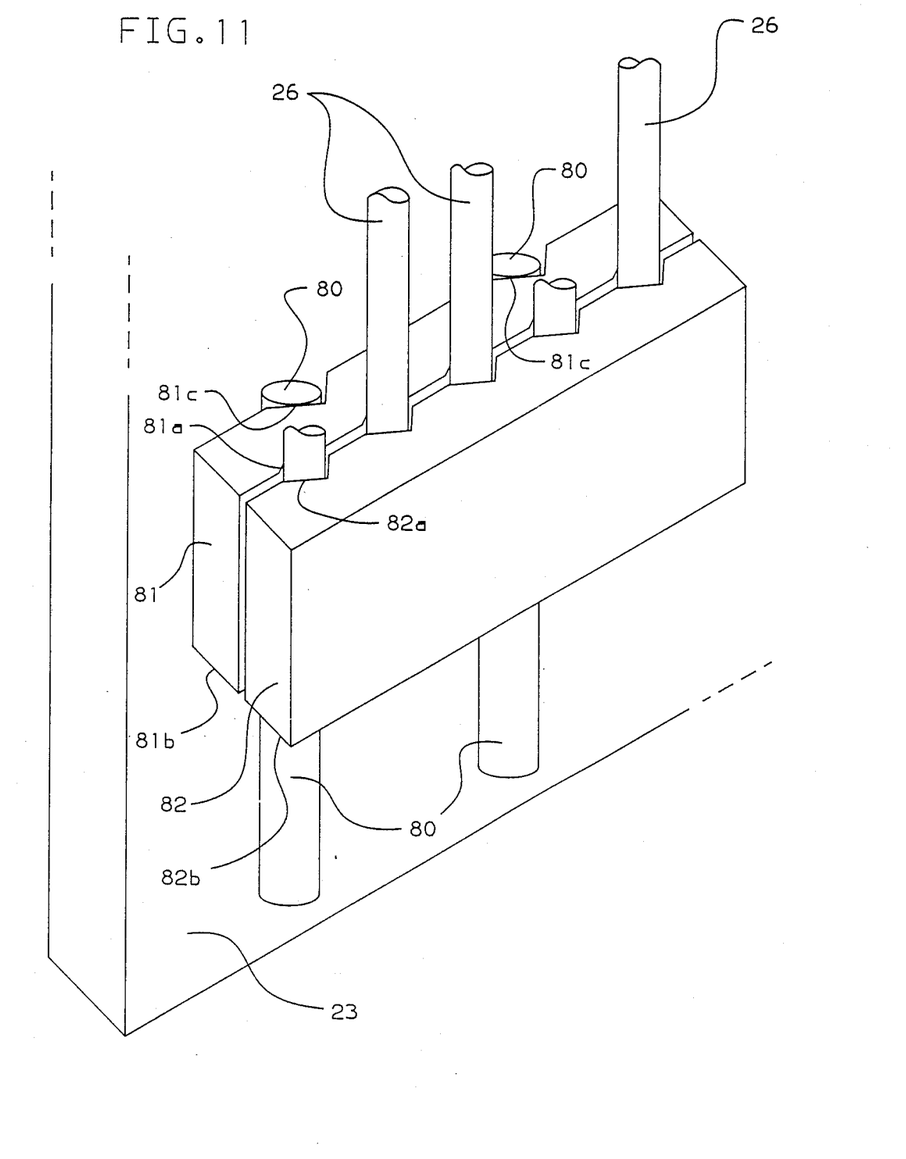
FIG. 11 is a partial view of the card of FIGS. 1, 2, 6 and 10 according to another preferred embodiment of the present invention.
Figure 12:
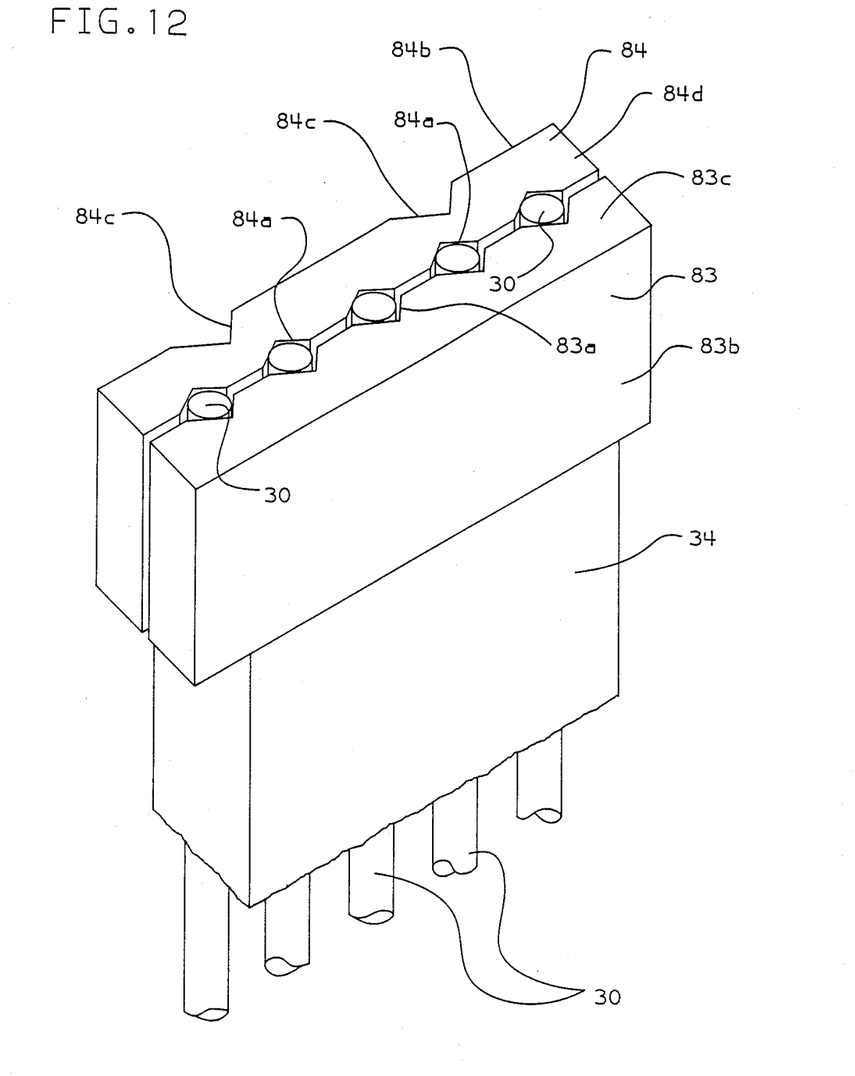
FIG. 12 is a partial view of the ribbon and mating end of FIGS. 1, 2, 6 and 10 according to said other preferred embodiment of the present invention.

In accordance with a preferred embodiment as shown in FIG. 11 the optical fiber lines 26 on card 23 are mounted via glass rods 80 and silicon blocks 81 and 82. The rods 80 extend parallel to each other and in the same direction as the grooves 25a and lines 26 in FIGS. 1–9. The silicon block 81 has V-grooves 81c therein photolithographically formed to be of precise shape to accurately position the block 81 on the rod. The inside surfaces of blocks 81 and 82 have V-shaped grooves 82a and 81a precisely formed as above to encapsulate the fiber lines therein that extend parallel to the rods and lines 26 in FIGS. 1–9. The blocks 81 and 82, rods 80, and fibers 26 are all bonded together to card or board 23. The fibers 26 terminate flush with the bottom surface 81b and 82b of the blocks. Note that the rods 80 extend below the blocks 81 and 82. As shown in FIG. 12 the mating half on the ribbon side comprises a pair of silicon blocks 83 and 84 encapsulating fibers 30 that have the plastic covering stripped away. These silicon blocks 83 and 84 similarly have the V-grooves 83a and 84a on the inner surface of the blocks to encapsulate the fibers 30 within the blocks. The block has an outer surface 84b with V-grooves 84c therein of the same dimension as the grooves 81c in like box 81 so when the block 84 is positioned tightly against rods 80 the fibers 30 are aligned with fibers 26. These V-grooves are likewise photolithographically formed. The opposite free surface 83b of the block 83 is fixed via the elastic interposer 38 to the carriage 50. The fibers 30 extend to be flush with the top surface 83c and 84d of blocks 83 and 84 respectively. These top surfaces 83c and 84d and the end of fiber 30 are cut and polished and so are the bottom surfaces 81 and 82b and the end of fibers 26 to provide good optical coupling between the fiber ends.

In the operation of this system motion of the actuator moves the blocks 83 and 84, encapsulating the fibers 30 in the XX direction so the glass rods 80 fit in the grooves 84c of block 84 and when the actuator 52 further moves in the ZZ direction, the carriage moves in the YY direction with the blocks 83 and 84 sliding along said glass rods 80 and contact blocks 81 and 82 and the fibers 30 contact fibers 26. The further movement of the actuator moves the block 84 tightly against the glass rods 80 with the fibers 26 and 30 tightly butted against each other to provide good optical coupling.

It will be apparent from the above description of the embodiment of the present invention, that changes may be made by those skilled in the art without departing from the true spirit and scope of the present invention; and the appended claims are intended to cover all such changes.

I claim:

1. An optical fiber connector mechanism interconnecting a first plurality of optical fiber lines on one structure with a second plurality of optical fiber lines on a second structure, comprising:
    said one structure including first contact means and said first plurality of optical fiber lines, said first contact means includes a first plurality of parallel optical fibers coupled to said first plurality of fiber lines;
    said second structure including a second contact means and a second plurality of optical fiber lines, said second contact means including a second plurality of parallel optical fibers coupled to said second plurality of lines, said second plurality of optical fibers being spaced and dimensioned to align with and mate in first plurality of fibers; and
    means coupled between said one and said second structure for moving said second plurality of optical fibers in a first direction and then a second orthogonal direction to mate with said first plurality of fibers end to end.

2. The combination of claim 1 wherein said first plurality of optical fibers are fixed in a common plane and said second plurality of optical fibers are fixed in a common plane and said movement in said first direction places said first fibers and said second fibers in the same common plane.

3. The combination of claim 2 wherein said one structure includes a guiding rail and said first contact means includes said first fibers mounted to said rail via a first grooved block mounted to said rail and said second contact means includes said second fibers slidably mounted to said rail via similar second grooved block carrying said second fibers which is first moved onto said rail and then slid along said rail to mate with said first grooved block.

4. An optical fiber connector mechanism interconnecting a first plurality of optical fiber lines on one structure with a second plurality of optical fiber lines on a second structure, comprising:
    said one structure including first contact means and said first plurality of optical fiber lines, said first contact means includes a first plurality of parallel optical fibers coupled to said first plurality of fiber lines and a first plurality of grooves colinear with said first plurality of fiber lines adapted to receive optical fibers colinear with said first plurality of optical fibers;
    said second structure including a second contact means and a second plurality of optical fiber lines, said second contact means including a second plurality of parallel optical fibers coupled to said second plurality of lines, said second plurality of optical fibers being spaced and dimensioned to align with and mate in said grooves and first plurality of fibers; and
    means coupled between said one and said second structure for moving said second plurality of fibers into said grooves and along said grooves to mate with said first plurality of fibers end to end.

5. A zero insertion force connector mechanism releasably optically interconnecting two structures, each said structure carrying optical fiber lines, said connector mechanism comprising:
    a common actuator means mounted on a second of said two structures so as to have one degree of freedom of movement only relative thereto between a first position and a second position, said common actuator locking said two structures in fixed relationship to each other when in an engaged juxtaposition;
    first contact means optically connected to said optical fiber lines on said first of said two structures and fixed relative to said first structure, said first contact means including first parallel optical fibers;
    said second structure incorporating optical fiber lines thereon; and
    second contact means including second optical fibers connected to said optical fiber lines and being carried by said common actuator means and being capable of independent orthogonal motion with two degrees of freedom relative to said first contact means by movement of said common actuator means, from its first to its second position while said first and second structures are maintained in engaged juxtaposition.

6. The connector mechanism of claim 5 wherein said common actuator means comprises a compound camming mechanism that produces time separated motion of said second optical fibers in different directions in a single actuation.

7. The connector mechanism of claim 6, wherein said common actuator means comprises:
    a carriage;
    at least one cam follower mounted on said carriage;
    a linear cam movable from said first position to said second position and arranged when away from said first position to engage said at least one cam followers; and
    a resilient interposer, said resilient interposer being fixed to said carriage and supporting said second contact means array;
    said carriage engaging said second structure so as to be fixed in the direction of movement of the linear cam and free to move in directions perpendicular thereto.

8. The connector mechanism of claim 5, wherein, said common actuator means includes means for producing the following time separated sequence of relative movements:

motion of said second contact means toward said first means until said fibers in said first and second contact means are aligned; and motion of said fibers of said first and second contact means until said fibers are aligned end to end.

* * * * *